US011096381B2

(12) United States Patent
Lee et al.

(10) Patent No.: US 11,096,381 B2
(45) Date of Patent: Aug. 24, 2021

(54) INTERACTIVE FISH TANK SYSTEM, AND INTERACTION PROVIDING METHOD OF THE SAME

(71) Applicant: KOREA ADVANCED INSTITUTE OF SCIENCE AND TECHNOLOGY, Daejeon (KR)

(72) Inventors: Woohun Lee, Daejeon (KR); Donghyeon Ko, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 252 days.

(21) Appl. No.: 16/383,987

(22) Filed: Apr. 15, 2019

(65) Prior Publication Data

US 2020/0008403 A1 Jan. 9, 2020

(30) Foreign Application Priority Data

Jul. 6, 2018 (KR) .................. 10-2018-0079038
Jan. 21, 2019 (KR) .................. 10-2019-0007500

(51) Int. Cl.
*A01K 63/00* (2017.01)
*A01K 61/85* (2017.01)
(Continued)

(52) U.S. Cl.
CPC ............ *A01K 63/006* (2013.01); *A01K 61/85* (2017.01); *A01K 63/042* (2013.01); *G05D 7/00* (2013.01);
(Continued)

(58) Field of Classification Search
CPC .. A01K 63/042; A01K 63/003; A01K 63/006; G05D 7/00; G05D 7/06;
(Continued)

(56) References Cited

U.S. PATENT DOCUMENTS 4,497,152 A * 2/1985 Weissner ............... E04H 4/141
119/790
4,554,419 A * 11/1985 King ....................... G09F 23/00
200/5 A
(Continued)

FOREIGN PATENT DOCUMENTS

JP H07-020807 1/1995
KR 20-0244839 10/2001
(Continued)

OTHER PUBLICATIONS

Naohiro Isokawa et al., "TalkingNemo: Aquarium Fish Talks Its Mind for Breeding Support", ACI 2016—3rd International Conference on Animal Computer Interaction: Broadening Participation, Proceedings, Published—Nov. 15, 2016.
(Continued)

*Primary Examiner* — Lisa L Tsang
(74) *Attorney, Agent, or Firm* — Lex IP Meister, PLLC

(57) ABSTRACT

An interactive fish tank system includes a nozzle array provided in a water tank, wherein a plurality of bubble nozzles from which bubbles are emitted are arranged in the nozzle array; a computing device configured to receive user action information inputted from at least one user action input device, generate bubble conversion information by which characteristics of the user action information are expressed as bubbles generated from at least one of the plurality of bubble nozzles, and generate a control signal for supplying air to emit bubbles corresponding to the bubble conversion information; and an air injection device connected to the plurality of bubble nozzles through hoses, wherein the air injection device supplies air to at least one of the plurality of bubble nozzles based on the control signal.

11 Claims, 10 Drawing Sheets

(51) Int. Cl.
*A01K 63/04* (2006.01)
*G06F 3/01* (2006.01)
*G05D 7/00* (2006.01)
*G05G 11/00* (2006.01)
*A01K 61/10* (2017.01)

(52) U.S. Cl.
CPC ............... *G05G 11/00* (2013.01); *G06F 3/01* (2013.01); *A01K 61/10* (2017.01)

(58) Field of Classification Search
CPC ........ G05D 7/0617; G05G 11/00; G06F 3/01; G06F 3/16; G06F 3/167
USPC .................. 119/245, 247, 253, 254, 263
See application file for complete search history.

(56) References Cited

U.S. PATENT DOCUMENTS

| | | | | |
|---|---|---|---|---|
| 4,612,876 A * | 9/1986 | Tigert | ............... | A01K 63/042 119/253 |
| 5,018,288 A * | 5/1991 | Yang | ............... | A63H 13/04 40/406 |
| 5,367,985 A * | 11/1994 | Wilkins | ............... | A01K 63/042 119/263 |
| 6,065,850 A * | 5/2000 | Chiu | ............... | A01K 63/003 362/101 |
| 6,187,394 B1 * | 2/2001 | Johnson | ............... | G09F 13/24 119/245 |
| 6,840,192 B1 * | 1/2005 | Pagano | ............... | A01K 63/042 119/254 |
| 7,310,900 B2 * | 12/2007 | Huang | ............... | G09F 13/24 40/406 |
| 8,807,777 B2 * | 8/2014 | Watanabe | ............... | G09F 9/30 362/101 |
| 2008/0006576 A1 * | 1/2008 | Suzuki | ............... | C02F 3/302 210/620 |
| 2008/0192027 A1 * | 8/2008 | Morrison | ............... | G06F 3/043 345/177 |
| 2008/0316732 A1 * | 12/2008 | Blake | ............... | A01K 63/06 362/101 |
| 2014/0075349 A1 * | 3/2014 | Yun | ............... | G06F 16/487 715/764 |
| 2016/0374316 A1 * | 12/2016 | Mainini | ............... | G06F 3/017 119/51.02 |
| 2018/0103614 A1 * | 4/2018 | Tsai | ............... | H04N 5/76 |

FOREIGN PATENT DOCUMENTS

| | | |
|---|---|---|
| KR | 10-2006-0045213 | 5/2006 |
| KR | 10-1357890 | 2/2014 |
| KR | 20-2017-0004071 | 12/2017 |

OTHER PUBLICATIONS

Donghyeon Ko et al., "BubbleTalk: Enriching Experience with Fish by Supporting Human Behavior", DIS 2018, Session 19: Animals & Wilderness, Hong Kong, pp. 919-930, Jun. 9-13 2018.
Patricia Pons et al., "Intelligent Playful Environments for Animals", ACM, Interacción '15, Vilanova i la Geltrú, Spain, Sep. 7-9, 2015.
Patricia Pons et al., "Envisioning Future Playful Interactive Environments for Animals", in A. Nijholt, ed., More Playful User Interfaces: Interfaces that Invite Social and Physical Interaction, pp. 121-150, Springer, 2015.
Scott Davidoff et al., "Rapidly Exploring Application Design Through Speed Dating", UbiComp 2007, LNCS 4717, pp. 429-446, 2007.

* cited by examiner

INTERACTIVE FISH TANK SYSTEM, AND INTERACTION PROVIDING METHOD OF THE SAME

CROSS-REFERENCE TO RELATED APPLICATION

This application claims priority to and the benefit of Korean Patent Application No. 10-2018-0079038 filed in the Korean Intellectual Property Office on Jul. 6, 2018 and Korean Patent Application No. 10-2019-0007500 filed in the Korean Intellectual Property Office on Jan. 21, 2019, the entire contents of which are incorporated herein by reference.

BACKGROUND

(a) Field

The present invention relates to an interaction technique between human and animals.

(b) Description of the Prior Art

Fish are one of the most popular pets at home. Even if you do not raise fish, you can easily see fish in aquariums, restaurants, and cafes. People relieve stress and feel emotional stability when they watch fish. People can also see the beautiful appearance of fish and feel aesthetic pleasure.

However, compared with other pets, people have a limited means of interaction with fish. Because of this, people regard fish as ornamental rather than as companion animals. People have a desire to physically interact with their pets. This also applies to fish, and activities such as scuba diving and snorkeling are typical activities to satisfy the desire to interact with fish. However, when raising fish at home, there is not enough space for people to enter a fish tank and interact with fish as in snorkeling, and putting a hand into a fish tank is also limited for safety of fish. Therefore, the desire to interact with home-grown fish remains unsatisfied.

In the field of human-computer interaction (HCI), there is an animal-computer interaction (ACI) technology. In this field, studies on interaction with animals are being carried out by using digital interfaces. Studies on interaction with animals are expected to help better understand animals and improve the quality of life of humans and animals. In fact, many studies in the field of ACI have used the technology to provide an abundance of interactions between humans and animals, and have improved the relationship between people and animals.

As with other studies in the ACI field, if people interact with fish with the help of digital interfaces, the relationship between people and fish can be improved to such an extent that it equals the relationship with companion animals. However, because people and fish live in different environments and fish do not respond well, raising fish has an interaction pattern that is different from raising other pets, but studies on this subject are lacking. Previously known examples of interaction with fish are for display works only, and are not suitable for the environment where fish are raised at home. In TalkingNemo (Isokawa et al., 2016), speech bubbles are made on a rear display of the fish tank and show the status of fish to people as if the fish speaks, but this is only monitoring the status of fish, so it is difficult to see this as interaction with fish. Therefore, a technology for supporting interaction with fish beyond the limited environment where fish and human are disconnected and interaction with fish is limited is required.

The above information disclosed in this Background section is only to enhance the understanding of the background of the invention and therefore it may contain information that does not form the prior art that is already known in this country to a person of ordinary skill in the art.

SUMMARY

The present invention has been made in an effort to provide an interactive fish tank system for supporting interaction between humans and aquatic animals.

An interactive fish tank system according to an exemplary embodiment includes: a nozzle array provided in a water tank, wherein a plurality of bubble nozzles from which bubbles are emitted are arranged in the nozzle array; a computing device configured to receive user action information inputted from at least one user action input device, generate bubble conversion information by which characteristics of the user action information are expressed as bubbles generated from at least one of the plurality of bubble nozzles, and generate a control signal for supplying air to emit bubbles corresponding to the bubble conversion information; and an air injection device connected to the plurality of bubble nozzles through hoses, wherein the air injection device supplies air to at least one of the plurality of bubble nozzles based on the control signal.

The nozzle array may be provided at a bottom of the water tank to form a bottom surface of the water tank.

The air injection device may include a plurality of air pumps that are respectively connected to the plurality of bubble nozzles.

The user action input device may include at least one of a microphone and a user gesture recognition device.

The user action information may include at least one of voice inputted by the microphone and gesture information inputted from the user gesture recognition device.

The user gesture recognition device may include at least one sensor attached to a wall of the water tank, wherein the at least one sensor recognizes user gestures including a touch at the wall.

The bubble conversion information may include at least one of a bubble position at which bubbles are emitted, a bubble size, a bubble duration, and a bubble speed.

The bubble position may correspond to at least one bubble nozzle that is at least one of the plurality of bubble nozzles, wherein the at least one bubble nozzle is disposed around an input point of the user action information, or at least one bubble nozzle from which bubbles are emitted if the user action information is inputted.

At least one of the bubble size, the bubble duration, and the bubble speed may be converted to express at least one of characteristics such as intensity, input time, input speed, and an amount of user action information.

The computing device may generate the control signal for determining a bubble position at which bubbles are emitted based on an input position of the user action information, or checking a bubble position at which bubbles are emitted if the user action information is inputted and operating the air injection device to supply air to a bubble nozzle of the plurality of bubble nozzles that corresponds to the bubble position.

Each bubble nozzle may be formed such that a tube of a predetermined length, from which air introduced into a connected hose escapes, passes through the inside of a body thereof. The body may include an insertion portion that is inserted into a hole of the nozzle array, a wing attached to the nozzle array, and a chamber wall of a predetermined height forming a space filled with the air introduced from the connected hose before the air is introduced into the tube.

A method for providing, by a computing device operated by at least one processor, interaction between a user and aquatic animals according to an exemplary embodiment, includes: receiving user action information inputted from at least one user action input device; generating bubble conversion information by which the user action information is expressed as bubbles generated inside a water tank; generating, according to the bubble conversion information, a control signal for emitting bubbles from at least one specific bubble nozzle of a plurality of bubble nozzles that are provided inside the water tank; and transmitting the control signal to an air injection device for supplying air to the specific bubble nozzle or a controller of the air injection device.

The receiving user action information may include receiving voice inputted by a microphone.

The receiving user action information may include receiving touch information from a user gesture recognition device. The user gesture recognition device may include at least one sensor, wherein the at least one sensor is attached to an outer wall of the water tank to recognize user gestures including a touch at the outer wall.

The generating of the bubble conversion information may include determining, as a bubble position, at least one bubble nozzle around a touch point when the touch information is received, and generating the bubble conversion information including the bubble position.

The bubble conversion information may include at least one of a bubble position from which bubbles are emitted, a bubble size, a bubble duration, and a bubble speed. The bubble position may correspond to at least one of the plurality of bubble nozzles.

According to the embodiment, people can interact with fish even if they are disconnected from fish in the fish tank. According to the embodiment of the present invention, people can interact with fish in the fish tank through bubbles controlled by a voice or a touch of the fish tank.

DETAILED DESCRIPTION OF THE EMBODIMENTS

Figure 1:
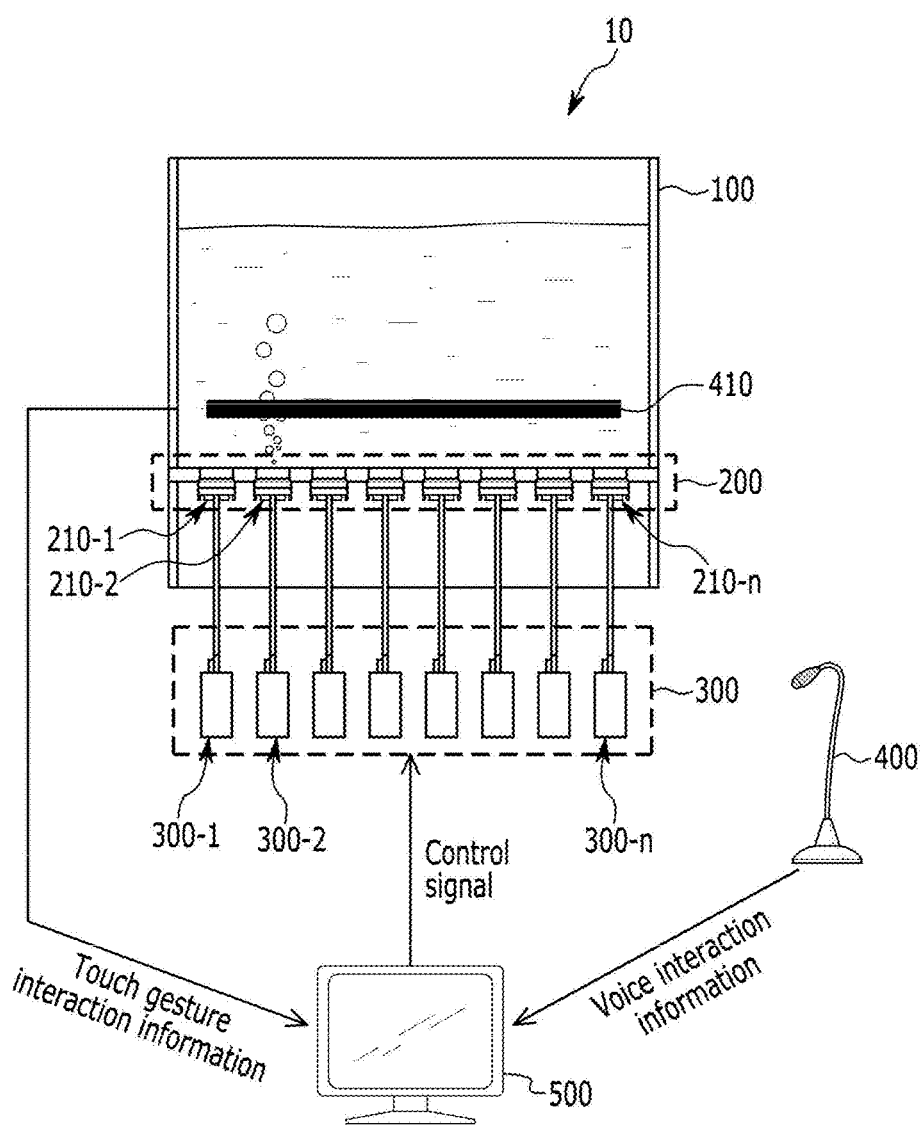
FIG. 1 is a structural diagram of an interactive fish tank system according to an exemplary embodiment.

The present invention will be described more fully hereinafter with reference to the accompanying drawings, in which exemplary embodiments of the invention are shown. However, as those skilled in the art would realize, the described embodiments may be modified in various different ways, all without departing from the spirit or scope of the present invention. In order to clearly illustrate the exemplary embodiments, parts not related to the description are omitted, and the same reference numerals are used for the same or similar elements throughout the specification.

Throughout the specification, unless explicitly described to the contrary, the word "comprise" and variations such as "comprises" or "comprising" will be understood to imply the inclusion of stated elements but not the exclusion of any other elements.

Figure 2:
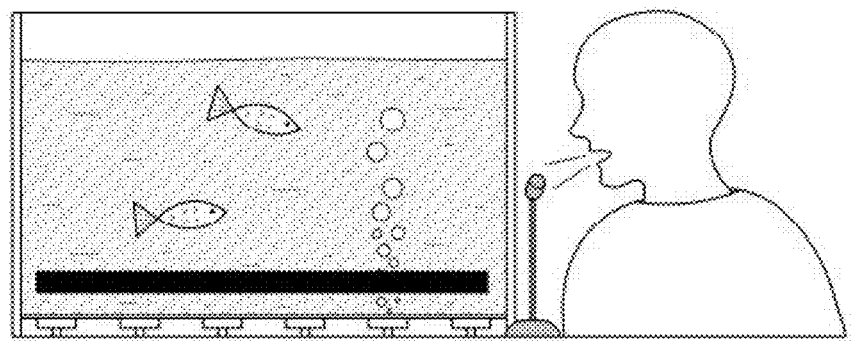
FIG. 2(a) of a voice channel, FIG. 2(b) of a touch channel and FIG. 2(c) of a voice touch channel show interaction channels generated between a person and a living thing in a water tank according to an exemplary embodiment.
Figure 2:
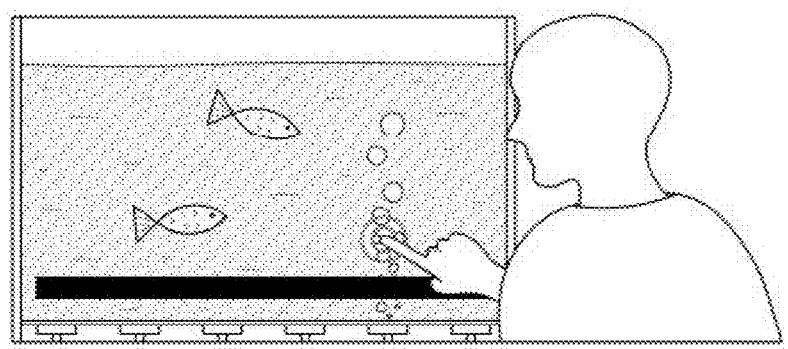
Figure 2:
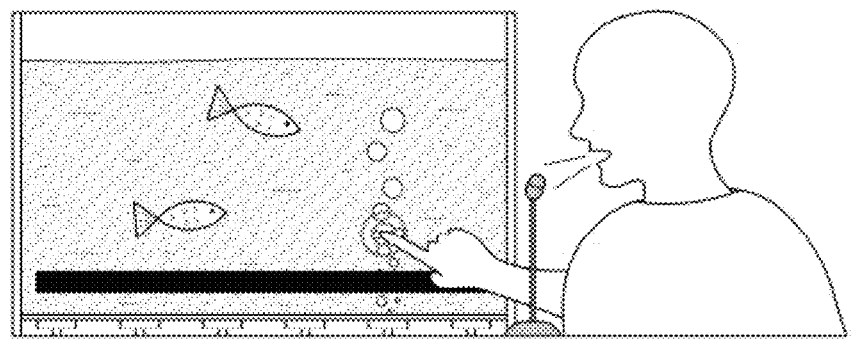

FIG. 1 is a structural diagram of an interactive fish tank system according to an exemplary embodiment, and FIG. 2 shows interaction channels generated between a person and a living thing in a water tank according to an exemplary embodiment.

Referring to FIG. 1, an interactive fish tank system 10 includes, a water tank 100, a nozzle array 200 in which a plurality of bubble nozzles 210-1, 210-2, . . . , and 210-n are arranged, an air injection device 300 for supplying air to a plurality of bubble nozzles 210-1, 210-2, . . . , and 210-n through a hose connected to them, and a computing device 500 for controlling an operation of the air injection device 300 based on user action information (input elements) inputted from at least one of user action input devices 400 and 410. In the drawing, in order to represent the computing device 500, the computing device 500 is located apart from the water tank 100, but the computing device 500 may be integrated into at least one of the water tank 100, the nozzle array 200, the air injection device 300, and at least one of user action input devices 400 and 410. The user action information is input elements for interacting with fishes.

The water tank 100 may be made of various materials and have various shapes.

The nozzle array 200 is provided in a part of the water tank 100 so that a plurality of bubble nozzles 210-1, 210-2, . . . , 210-n generate bubbles into the water tank 100. The outputted bubbles are output elements corresponding to the input elements. In the present invention, the nozzle array 200 is provided on a bottom surface of the water tank 100, but the nozzle array 200 may be installed at various positions depending on the shape and size of the water tank 100, and may be provided on a wall of the water tank, for example. In the present invention, a plurality of bubble nozzles are arrayed in parallel at equal intervals so that fish can easily avoid bubbles, but arrangement of the plurality of bubble nozzles may be designed in various ways. The nozzle array 200 is manufactured as a module such that it is attached to/detached from the water tank 100, and may be easily assembled/disassembled. The nozzle array 200 may be disposed on the bottom surface of the water tank 100 of which the bottom is open.

The size of bubbles generated by each of the plurality of bubble nozzles may be the same or different. A structure of each bubble nozzle may be designed according to its bubble size.

The air injection device 300 provides air to at least one of the bubble nozzles that is specified by a control signal of the computing device 500. The connection between the air injection device 300 and the plurality of bubble nozzles can be designed in various ways. In the description, it is assumed that the air injection device 300 consists of a plurality of air pumps 300-1, 300-2, . . . , 300-n, and one air pump is connected to one bubble nozzle.

Each of the plurality of air pumps 300-1, 300-2, . . . , and 300-n operates according to the control signal of the computing device 500, thereby providing air to the bubble nozzles. The air pump may include an air compressor, and a speed, an operating time, etc. of the air compressor may be controlled.

The user action input devices 400 and 410 may include a microphone 400, and a gesture recognition device 410 that is provided outside of the water tank 100 to recognize a user's gesture. The microphone 400 and the gesture recognition device 410 are connected to the computing device 500, and transmit inputted information to the computing device 500.

The microphone 400 transmits an inputted voice to the computing device 500. There may be various kinds or types of the microphone 400, and for example, a standing microphone may be used to provide perceptual affordance to people and to enhance interaction with fish. The microphone 400 may be replaced with a microphone of a mobile terminal (not shown).

The gesture recognition device 410 includes at least one sensor that is capable of recognizing a gesture such as a user's touch, and transmits the recognized gesture information to the computing device 500. The gesture recognition device 410 may be of various types and forms, and may be, for example, a device that is attached to an external surface of the water tank 100 and recognizes a user's gesture including a touch on the wall by using an infrared sensor or the like. Alternatively, the gesture recognition device 410 may be a device that recognizes a user's gesture by using a camera sensor.

The computing device 500 generates bubble conversion information by which the user action information (voice, touch) transmitted from at least one of the microphone 400 and the gesture recognition device 410 is converted into bubbles. The bubble conversion information may include a bubble position where bubbles are emitted, a bubble size, a bubble duration, a bubble speed, and the like. The bubble conversion information may include a pattern that is generated by bubbles. The computing device 500 may determine the bubble information that is generated by a specific bubble nozzle according to a volume or duration of a voice, a touch position, a number of touches, and a touch time. The computing device 500 may receive information on different types and sizes of aquatic animals in the water tank, and generate different bubble conversion information according to the information on types and sizes of the aquatic animals.

The computing device 500 determines the bubble nozzle from which bubbles are emitted and the air pump connected to the bubble nozzle. The computing device 500 generates a control signal for providing air to the bubble nozzle such that a bubble size corresponding to the bubble conversion information is generated from the bubble nozzle for a predetermined time. Then, the computing device 500 transmits the control signal to the air pump that corresponds to the bubble nozzle from which bubbles are emitted. After receiving the control signal, the air pump operates the air compressor according to the control signal, thereby sending air to the connected bubble nozzle.

The computing device 500 is implemented by at least one processor, and may be of various types and forms. The computing device 500 may be implemented by a processor for an interactive fish tank system 10 only, and may include a program/application for performing the operation of the present invention. The computing device 500 may be a general purpose notebook or a mobile terminal that is equipped with a program/application for performing the operation of the present invention. In this case, the notebook or mobile terminal may be wired or wirelessly connected to the user action input device, and may transmit the control signal to the air injection device 300 by a wire or wirelessly. Alternatively, instead of transmitting the control signal to the air injection device 300, the notebook computer or the mobile terminal may transmit the control signal by a wire or wirelessly to a controller connected to the air injection device 300. Then, the controller connected to the air injection device may operate at least one air injection device according to the control signal. The air injection device controller may simply be an Arduino-based controller.

Referring to FIGS. 2(a), 2(b) and 2(c), an interactive fish tank system 10 converts user input information of a voice and/or a gesture into bubbles to provide an interaction channel between a person and aquatic animals in a fish tank (typically fish). The interaction channel may includes a voice channel that converts a user's voice into bubbles, a touch gesture channel that converts a gesture of a user touching a wall of the fish tank into bubbles, and a voice and touch gesture channel that convert a user's voice and gesture into bubbles.

Figure 3:
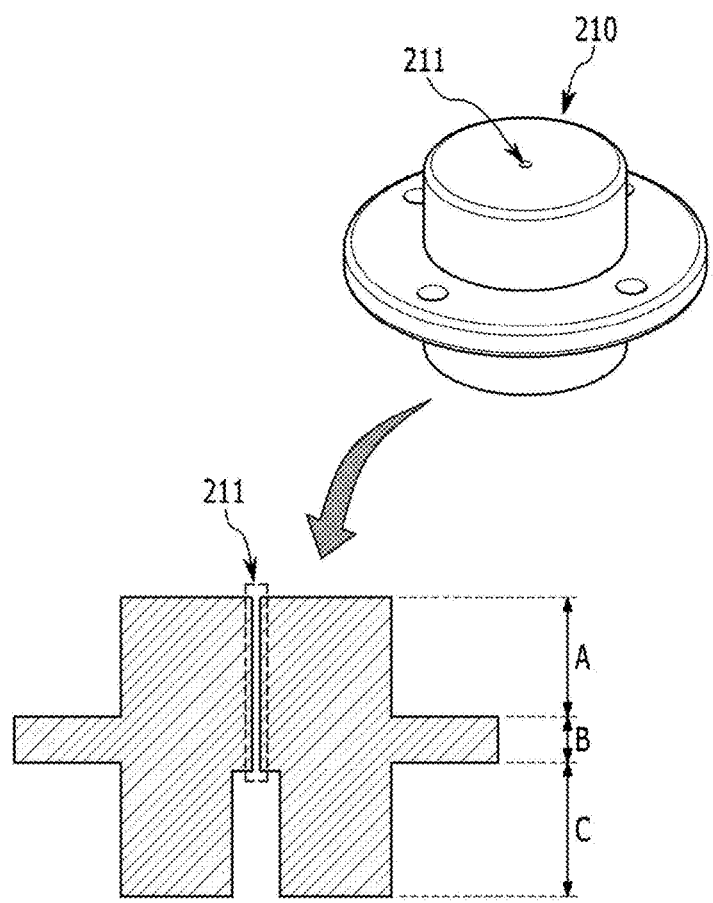
FIG. 3 is a structural diagram of a bubble nozzle according to an exemplary embodiment.
Figure 4:
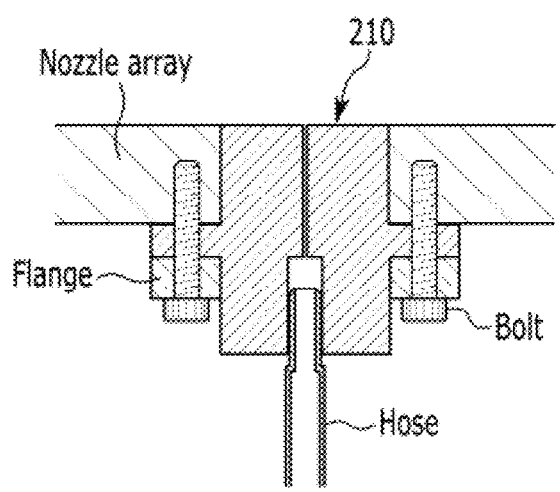
FIG. 4(a) and FIG. 4(b) show how a bubble nozzle according to an exemplary embodiment is combined to a nozzle array.
Figure 4:
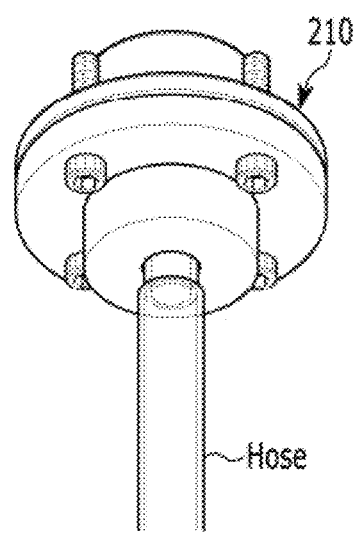

FIG. 3 is a structural diagram of a bubble nozzle according to an exemplary embodiment, and FIGS. 4(a) and 4(b) show a bubble nozzle according to an exemplary embodiment combined to a nozzle array.

Referring to FIG. 3, a bubble nozzle 210 is formed such that a tube 211 through which air introduced from a hose passes, and a body is formed such that it is inserted into and combined with a hole of the nozzle array 200. The bubble nozzle 210 may include an insertion portion A that is inserted into the hole of the nozzle array 200, a wing B attached to the nozzle array 200, and a chamber wall C that forms an air chamber, that is, a space filled with the air introduced from the hose.

A bubble size is adjusted according to a diameter of the tube 211. When the air pressure is stronger than the water pressure, bubbles are emitted into the water, but the bubble size may be limited by the diameter of the tube 211. A length of the tube 211 is a height from an inlet of the chamber through which the air enters the tube to a point where the air escapes. Pressure is controlled according to the length of the tube 211, and a bubble response may be controlled by the pressure. That is, the shorter the length of the tube 211, bubbles are better emitted.

Referring to FIG. 4(a), the insertion portion A (see FIG. 3) of the bubble nozzle 210 is manufactured according to a size of a hole of the nozzle array 200.

Referring to FIG. 4(a), the wing B (see FIG. 3) of the bubble nozzle 210 may be formed such that it is attached to the nozzle array 200 by a bolt. In this case, a flange may be fixed by the bolt after it is placed in contact with the wing B of the bubble nozzle 210. The flange uniformly distributes the pressure that is applied to the wing portion B by the bolt, and tightly attaches the bubble nozzle 210 to the nozzle array 200. The flange may be made of an acrylic material, or may be made of various materials and may have various thicknesses.

Referring to FIG. 4(b), the hose connected to an air injection device is attached to the chamber wall C (see FIG. 3) of the bubble nozzle 210. The thicker the thickness of the chamber wall C, and the longer the length of the tube 211 is, the better the bubble nozzle 210 swells. When the chamber wall C is thicker and the tube 211 is shorter, the bubble nozzle 210 does not swell and it maintains its shape. Accordingly, the length of the tube 211 and the thickness of the chamber wall C can be adjusted, thereby removing noticeable elements except for bubbles.

The bubble nozzle 210 may be made of various materials, and may be made of a silicone material, for example. Silicone is water-repellent because it has a hydrophobic organic group such as a methyl group attached around it. Water repellency means that surface energy of silicone is greater than surface tension of water, and a contact angle increases to form bubbles (water drop). If the bubble size is larger than the hole of the tube, water cannot enter the tube of the bubble nozzle 210, and the air escapes from the tube of the bubble nozzle 210 by the air pressure of the air injection device 300. In this way, air escapes from the bubble nozzle 210 in one direction.

Since the shape of the bubble nozzle 210 may affect the structure and aesthetics of the fish tank, it is desirable for the bubble nozzle 210 to not be visible. Also, even if the bubble nozzle 210 is combined to the nozzle array 200, it is desirable for the bubble nozzle 210 to be made of a water-resistant material (for example, silicone) so that water does not leak.

Figure 5:
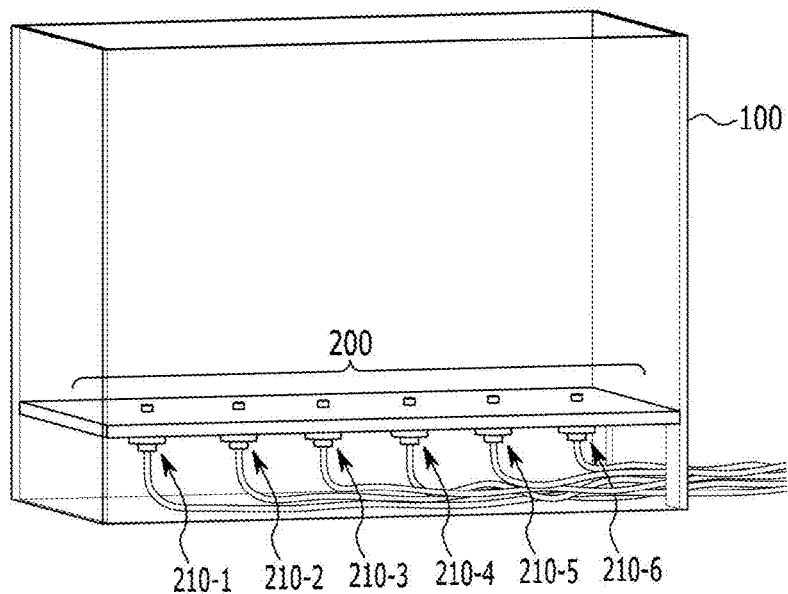
FIG. 5 is a structural diagram of a nozzle array disposed at a bottom of a water tank according to an exemplary embodiment.

FIG. 5 is a structural diagram of a nozzle array disposed at a bottom of a water tank according to an exemplary embodiment.

Referring to FIG. 5, a nozzle array 200 to which a plurality of bubble nozzles 210-1, 210-2, . . . , and 210-6 are combined may form a bottom surface of a water tank 100. In this case, the nozzle array 200 may be manufactured as a module such that it is attached to and detached from the water tank 100. The water tank 100 of which the bottom is open has a structure to which the nozzle array 200 can be attached at a certain height from the base.

When there are a plurality of air pumps outside of the water tank 100, a hole through which hoses for connecting the plurality of bubble nozzles and the plurality of air pumps outside of the water tank 100 are drawn out of the water tank 100 may be formed at a side of the water tank 100.

Since the bottom surface of the water tank 100 is formed by the nozzle array 200, easier assembly/disassembly should be ensured by the nozzle array 200 without leakage of water filled in the water tank. To this end, a gasket (not shown) may be inserted between the nozzle array 200 and a bottom layer (not shown) to prevent water from leaking. The nozzle array 200 and the bottom layer are combined while interposing the gasket therebetween. The gasket may be a silicone gasket, and may be formed according to the bottom surface of the water tank 100, thereby preventing water from leaking from an edge of the nozzle array 200.

Figure 6:
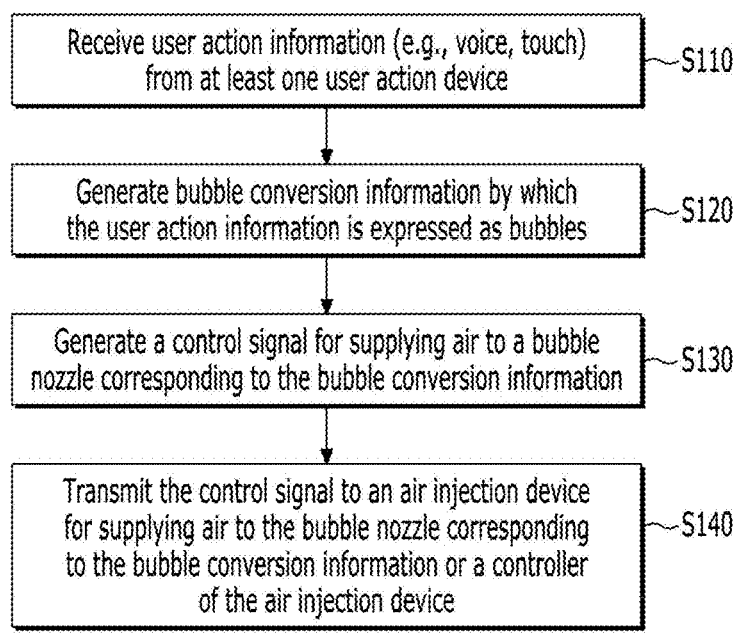
FIG. 6 is a flowchart of a method for operating an interactive fish tank system according to an exemplary embodiment.

FIG. 6 is a flowchart of a method for operating an interactive fish tank system according to an exemplary embodiment.

Referring to FIG. 6, a computing device 500 receives user action information (e.g., voice, touch, etc.) from at least one user action input device (S110). The user action input device may include a microphone 400 that receives a user's voice, and a gesture recognition device 410 that is attached to a wall of the water tank 100 to recognize a user's gesture such as a touch and the like.

The computing device 500 extracts characteristics of the user action information, and generates bubble conversion information by which the characteristics of the user action information are expressed as bubbles (S120). The bubble conversion information may include a bubble position where bubbles are emitted, a bubble size, a bubble duration, a bubble speed, and the like. The bubble size, the bubble duration, and the bubble speed may be determined based on the size, intensity, input time, input speed, etc. of the user action information. When receiving a voice as the user action, the computing device 500 may set the bubble duration in proportion to a duration of the inputted voice. When receiving a voice as the user action, the computing device 500 may determine at least one of a predetermined bubble nozzle, a bubble nozzle close to the microphone 400, or a bubble nozzle close to the detected fish from a plurality of bubble nozzles. When bubble sizes formed by the plurality of bubble nozzles are different, the computing device 500 may determine, as the bubble position, a bubble nozzle that forms larger bubbles as the voice becomes louder. When receiving a touch gesture as the user action, the computing device 500 may determine at least one of the bubble position, the bubble size, and the bubble duration based on at least one of a touch position, a touch time, and a number of touches. When receiving the user action information quickly, the computing device 500 may generate the bubble conversion information that makes the bubble speed quicker.

The computing device 500 generates a control signal for supplying air to the bubble nozzle corresponding to the bubble conversion information (S130). An air injection device provides air to the bubble nozzle corresponding to the bubble conversion information according to the control signal, and the information and a protocol included in the control signal may depend on the air injection device or a controller of the air injection device.

The computing device 500 transmits the control signal to the air injection device or the controller of the air injection device that supplies air to the bubble nozzle corresponding to the bubble conversion information (S140). After receiving the control signal, the air injection device operates an air compressor according to the control signal and supplies air to the connected bubble nozzle.

Alternatively, the computing device 500 may directly or indirectly transmit the control signal to the air injection device/a plurality of air pumps. For example, instead of directly sending the control signal to the air injection device/the plurality of air pumps, the computing device 500 may transmit the control signal to a controller (e.g., an Arduino-based controller) that is connected to the air injection device/the plurality of air pumps. Then, the air injection device controller may operate at least one air injection device according to the control signal.

The interactive fish tank system according to the present invention may be modified in various different ways such that the internal environment of the fish tank is changed according to human actions.

Figure 7:
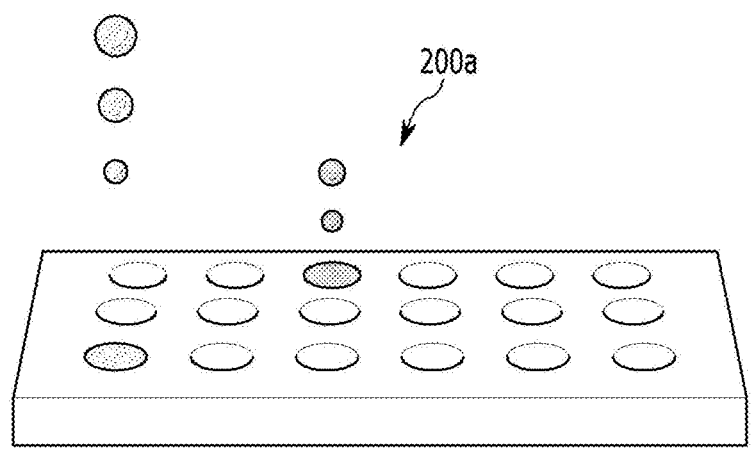
FIG. 7 is an exemplary view of a nozzle array according to another exemplary embodiment.

FIG. 7 is an exemplary view of a nozzle array according to another exemplary embodiment.

Referring to FIG. 7, the nozzle array 200 of the interactive fish tank system 10 may be replaced with a nozzle array 200a in which a plurality of bubble nozzles are arranged on a two-dimensional (2D) plane or light-emitting elements are included.

In the nozzle array 200a, the plurality of bubble nozzles may be arranged on the plane to generate bubbles into a water tank 100 from a bottom of the water tank 100. The 2D nozzle array 200*a* may include at least one light emitting device (e.g., an LED).

Controlled by the computing device 500, bubbles are emitted from at least one of a plurality of nozzles of the nozzle array 200*a*.

Controlled by the computing device 500, light may be emitted from a specific position of the nozzle array 200*a*.

The computing device 500 generates, according to the position where user action information (a voice and/or a gesture) is received and intensity of the user action information, conversion information by which bubbles are controlled to be emitted or light is emitted from at least one of the nozzles that are arranged on the plane. The conversion information according to the received user action information may be generated in various ways in consideration of a user's interest and a degree of interaction with aquatic animals in the tank. For example, the computing device 500 may control bubbles or light to be emitted from the nozzles that are arranged in a column close to a position where a voice or a touch is received. The computing device 500 may control the nozzles such that the stronger the intensity of a touch or a voice is, the more bubbles are emitted or more light is emitted from more nozzles.

Figure 8:
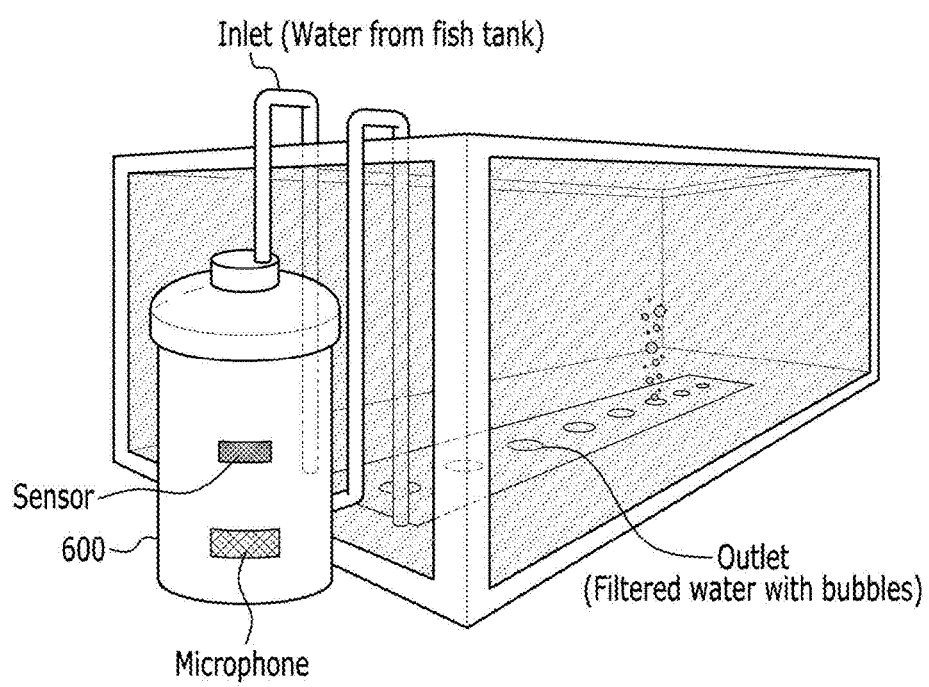
FIG. 8 is a structural view of a filter-coupled interactive fish tank system according to an exemplary embodiment.

FIG. 8 is a structural view of a filter-coupled interactive fish tank system according to an exemplary embodiment.

Referring to FIG. 8, a filter-coupled interactive fish tank system 20 uses an interactive filter 600 to receive information of user's action, and can express the user action as bubbles. A user can communicate with aquatic animals through the interactive filter 600 without changing a fish tank. The interactive filter 600 may have various shapes.

The interactive filter 600 circulates water in a water tank through an inlet for receiving water from the water tank and an outlet for discharging filtered water to the water tank, and includes an interaction function. That is, the interactive filter 600 may further include a nozzle array of an interactive fish tank system 10, an air injection device, at least one user action input device, and a computing device. The user action input device may be, for example, a microphone, a gesture recognition sensor (an infrared sensor and/or a camera sensor), and the like.

The outlet of the interactive filter 600 may be disposed at a bottom of the water tank, and bubbles may be emitted when the user action information is received. The position/intensity of water/bubbles that are emitted from the outlet of the interactive filter 600 may depend on the user actions. Alternatively, the outlet of the interactive filter 600 may be disposed over the water tank, and bubbles may be generated downward according to the user action information.

The information expressed in the water tank according to the user action has been described by taking bubbles or a light-emitting element as an example, but the present invention is not limited thereto and may be modified in various ways.

For example, a shape-changing structure (not shown) may be provided in the water tank, and an air pressure corresponding to the user action may change the shape of the structure. The air pressure is controlled by the computing device 500 based on the user action. The shape of the structure can be bent or expanded, for example. For example, controlled by the computing device 500, the structure may be bent toward the aquatic animals in the water tank such that a user and the aquatic animals can communicate with each other.

In addition, a structure (not shown) for feeding food into the water tank is provided, and when the user action information is received, that is, when the user speaks or acts, the food can be discharged from the structure.

As described above, the interactive fish tank system 10 provides an interface that can help human-fish interaction, thereby exploring its effect and value on a change in human experience and interaction with fish. Through the interactive fish tank system 10, a relationship with underwater animals may be improved by interacting with less reactive underwater animals. In particular, people can be confident about their interactions when their actions are well communicated and fish respond to their actions, and the relationship with fish may be more intimate than before. Such promoted interaction with fish may enhance values that people have when they feed fish. In addition, people may enhance their understanding of individual fish through the interaction.

In other words, because the interactive fish tank system 10 provides an abundance of interaction with fish, the values of raising fish may be enhanced, intimacy with fish may be improved, and understanding of fish may be improved, thereby having a positive effect on fish and people's lives. The interactive fish tank system 10 may also provide a new experience for people.

The embodiments of the present invention described above are not implemented only by the device and method, but may be implemented through a program for realizing a function corresponding to a configuration of the embodiment of the present invention or a recording medium on which the program is recorded.

While this invention has been described in connection with what is presently considered to be practical exemplary embodiments, it is to be understood that the invention is not limited to the disclosed embodiments, but, it will be understood by those skilled in the art that various modifications and equivalent embodiments are possible.

What is claimed is:

1. An interactive fish tank system comprising:
   a nozzle array provided in a water tank, wherein a plurality of bubble nozzles are arranged in the nozzle array;
   a computing device configured to receive user action information inputted from at least one user action input device, generate bubble conversion information by which characteristics of the user action information are expressed as bubbles generated from at least one of the plurality of bubble nozzles, and generate a control signal for supplying air to allow the at least one of the plurality of bubble nozzles to emit the bubbles corresponding to the bubble conversion information; and
   an air injection device connected to the plurality of bubble nozzles through a plurality of hoses respectively, wherein the air injection device supplies the air to the at least one of the plurality of bubble nozzles based on the control signal,
   wherein each of the plurality of bubble nozzles comprises:
   a body; and
   a tube having a predetermined length and passing through an inside of the body, wherein the air introduced into a corresponding hose among the plurality of hoses escapes through the tube, and
   wherein the body comprises:
   an insertion portion that is inserted into a hole of the nozzle array;
   a wing attached to the nozzle array by a bolt while the insertion portion is inserted into a hole of the nozzle array; and a chamber wall having a predetermined height and forming a space filled with the air introduced from the corresponding hose before the air is introduced into the tube.

2. The system of claim 1, wherein
the nozzle array is provided at a bottom of the water tank to form a bottom surface of the water tank.

3. The system of claim 1, wherein
the air injection device includes
a plurality of air pumps that are respectively connected to the plurality of bubble nozzles.

4. The system of claim 1, wherein
the user action input device includes
at least one of a microphone and a user gesture recognition device, and
the user action information includes at least one of voice inputted by the microphone and gesture information inputted from the user gesture recognition device.

5. The system of claim 4, wherein
the user gesture recognition device includes
at least one sensor attached to a wall of the water tank, wherein the at least one sensor recognizes user gestures including a touch at the wall.

6. The system of claim 1, wherein
the bubble conversion information includes
at least one of a bubble position at which the bubbles are emitted, a bubble size, a bubble duration, and a bubble speed.

7. The system of claim 6, wherein
the bubble position corresponds to
at least one bubble nozzle that is the at least one of the plurality of bubble nozzles, wherein the at least one bubble nozzle is disposed around an input point of the user action information, or at least one bubble nozzle from which the bubbles are emitted if the user action information is inputted.

8. The system of claim 6, wherein
at least one of the bubble size, the bubble duration, and the bubble speed is converted to express at least one of characteristics such as intensity, input time, input speed, and an amount of user action information.

9. The system of claim 1, wherein
the computing device generates
the control signal for determining a bubble position at which the bubbles are emitted based on an input position of the user action information, or checking a bubble position at which the bubbles are emitted if the user action information is inputted and operating the air injection device to supply the air to the at least one of the plurality of bubble nozzles that corresponds to the bubble position.

10. The system of claim 1, wherein a height of the insertion portion is equal to a height of the nozzle array.

11. The system of claim 1, wherein a bubble response of the bubbles emitted from each of the plurality of bubble nozzles is controlled based on a length of the tube comprised in each of the plurality of bubble nozzles.

* * * * *